United States Patent

[11] 3,634,858

| [72] | Inventor | John Mitchell |
| | | 16 Weldon Lane, Farmingville, N.Y. 11738 |
| [21] | Appl. No. | 800,369 |
| [22] | Filed | Feb. 14, 1969 |
| [45] | Patented | Jan. 11, 1972 |

[54] SYNCHRONOUS RADAR RECORDER AND REPRODUCER
1 Claim, 1 Drawing Fig.

[52] U.S. Cl. ..................................... 343/5 R, 35/10.4
[51] Int. Cl. ..................................... G01s 7/02
[50] Field of Search ........................... 343/5; 35/10.4

[56] References Cited
UNITED STATES PATENTS

| 2,863,227 | 12/1958 | Chubb et al. ............... | 35/10.4 |
| 3,354,438 | 11/1967 | Sandlin et al. .............. | 343/5 X |
| 3,444,553 | 5/1969 | Tsumura et al. ............. | 343/5 |

*Primary Examiner*—T. H. Tubbesing
*Attorney*—Frank Makara

ABSTRACT: This invention relates to radar apparatus for recording radar information on magnetic tape for subsequent playback into a radar display system. To accurately record this radar information a plurality of signals are recorded simultaneously. These signals include the radar video signal, the beginning of sweep or trigger signal, the reference servo voltage and the stator synchronizing voltage. This invention produces the desirable feature of locking the recorder to the antenna rotation for exact playback.

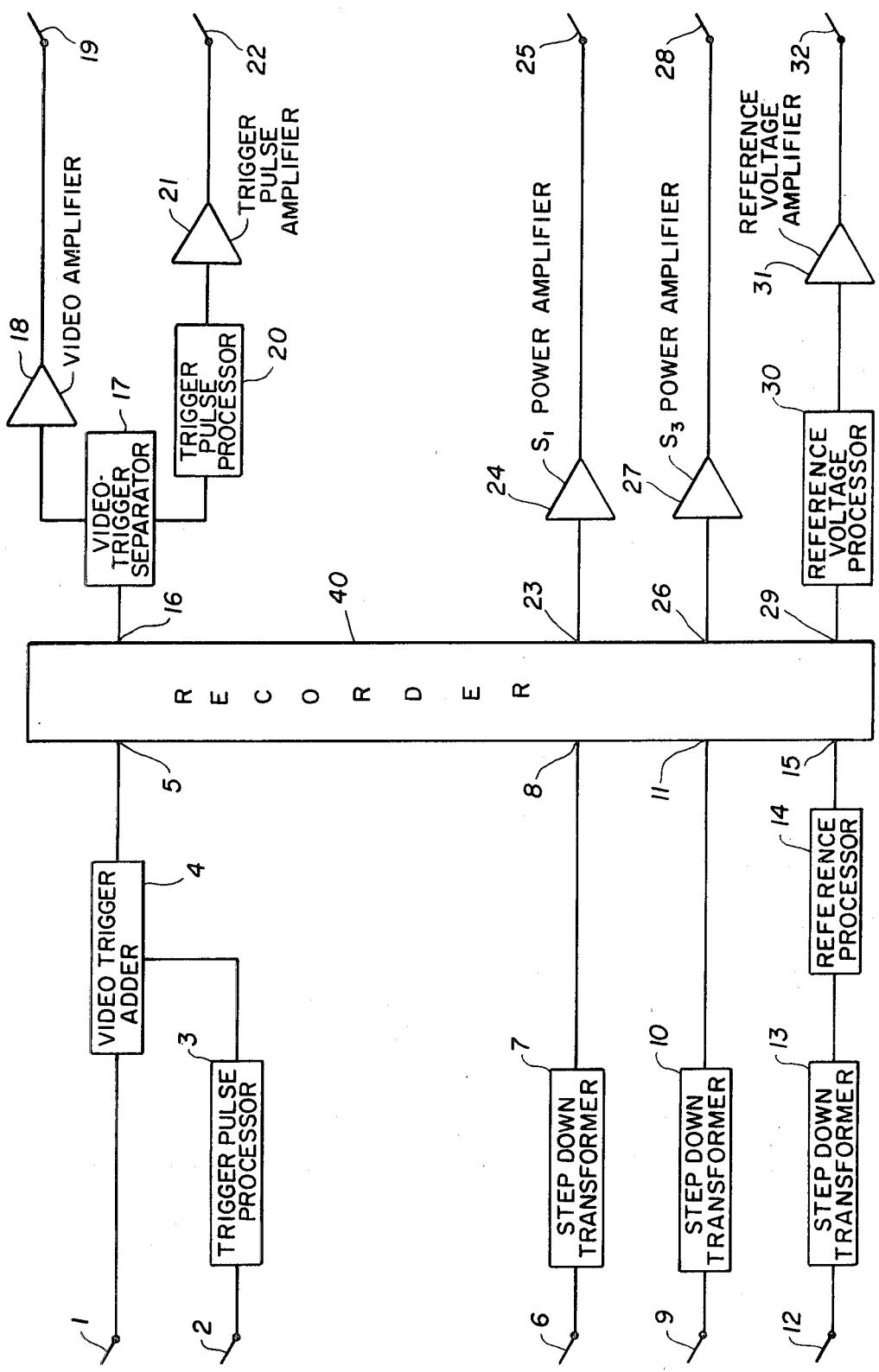

SYNCHRONOUS RADAR RECORDER AND REPRODUCER

An object of this invention is to record all necessary information common to radar signals so that the playback signals will be capable of driving a pulse position indicator radar display system.

An other object of this invention is to record the radar reference voltages and synchronous voltages in such a manner that, upon playback, the radar presentation will be jitter-free and indistinguishable from a live presentation.

A further object of the invention is to record the radar reference voltage in such a manner as to cause the magnetic recorder to be synchronized with the radar antenna rotation.

Still another object of the invention is to provide a variable clipper so that noise in the incoming radar video signal may be reduced substantially or even completely eliminated, if desired.

These and other objects of this invention will become apparent upon reading the descriptive disclosure of an illustrative embodiment of the invention as shown in the accompanying drawing.

In accordance with this invention, the radar video and trigger signals are combined into a composite signal and recorded on the wideband channel as described hereinafter. The synchronous voltages S1 and S3 are each recorded on separate longitudinal tracks. The reference voltage is reduced in amplitude, converted into a square wave signal and also recorded on a separate longitudinal track in the form of a control track.

On existing wideband recorders a control track signal is generated internally in the recording equipment. This signal bears no relationship to the radar information. Synchronous information is generally multiplexed and recorded on an auxiliary channel. Accordingly, due to the inherent instability of multiplexing techniques, jitter and uneven motion generally is evident in the reproduced image.

Turning to the drawing, the video signal enters the equipment at the video input connector 1, and is supplied to the video-trigger adder 4. The adder circuitry clips the video base line by a variable clipper. This clipper permits noise on the base line to be clipped out as desired.

The radar trigger signal, normally about 40 volts peak-to-peak, enters the system at the trigger input 2 and is routed to the trigger pulse processor 3. The pulse processor reduces the pulse signal to an amplitude of one-half volt and inverts it so that it travels in a negative direction. From the processor the negative trigger pulse is delivered to the video-trigger adder 4. This adder circuitry adds the positive going video signal and the negative-going trigger pulse into a composite signal. This composite signal is then connected to the recorder signal input 5.

To obtain the correct azimuth positioning, it is necessary to record a reference voltage and the synchronous voltages. Normally three synchronous voltages are provided and are identified as S1, S2 and S3.

However, any two of the three voltages will create a perfect sweep if the third synchronous winding is held at ground potential.

Synchronous winding S2 is grounded external to the system. Synchronous voltage S1 enters the system at the S1 input 6 and is routed to the stepdown transformer 7. The function of transformer 7 is to reduce the synchronous voltage from its normal 100 volt peak-to-peak level to a 1-volt pulse position level. From the transformer the S1 voltage enters the recorder 40 at the auxiliary input 8, and is recorded longitudinally on the magnetic tape. Likewise, synchronous voltage S3 enters the system at the S3 input 9 and is supplied to the stepdown transformer 10 and enters the recorder at auxiliary input 11. This signal is then recorded longitudinally on a separate track.

Simultaneously, the radar reference voltage, normally at an amplitude of 117 volts root mean square, enters the system at the reference input 12 and is supplied to stepdown transformer 13 where the amplitude is reduced to about 6 volts root mean square. This signal is then delivered to the reference processor 14, which is a Schmitt trigger. This processor converts the sine wave to a square wave which enters the recorder at the external control track input 15. It is then recorded longitudinally on the magnetic tape in the form of a control track, to be used on playback to synchronize the recorder.

Accordingly, the radar video signal is recorded on the magnetic tape as the main track of the tape, and the synchro-one is recorded on said tape as auxiliary-one track, and synchro-three is recorded on said tape as auxiliary-two track. The fourth track, on the tape of this invention, is the control track, which is generated from the radar reference voltage and which constitutes the locking means of this invention. Thus, each signal is recorded on its own track, thereby negating the use of the prior art multiplex and demultiplex procedures conventionally used.

In the playback mode the composite video signal leaves the recorder at the signal output 16. This composite signal is supplied to the video-trigger separator 17 where the positive-going video signal is separated from the negative-going trigger pulse. The video signal is then amplified in the video amplifier 18 and leaves the system at the video signal output 19. The negative trigger pulse is converted back to its original positive direction in the trigger pulse processor 20, is amplified to its original amplitude by the trigger amplifier 21 and leaves the system at the trigger output 22.

Synchronous voltage S1 leaves the recorder at auxiliary output 23, is amplified back to its original amplitude by the S1 power amplifier 24 and leaves the system by way of S1 output 25. Synchronous voltage S3 leaves the recorder at auxiliary output 26, is amplified back to its original amplitude by the S3 power amplifier 27 and leaves the system by way of S3 output 28.

On playback, the reference voltage according to this invention serves two functions. First, it is used internally in the recorder in the form of a servocontrol signal to control the playback speed of the recorder. It is apparent that any variations in the original reference signal causes the recorder to vary accordingly, resulting in a smooth playback presentation. To complete its second function, the reference voltage leaves the recorder at the control track output 29 and is supplied to the reference voltage processor 30. In this processor the square wave signal is converted back into a sine wave, phase corrected and routed to the reference voltage amplifier 31. Here it is amplified back to its original 117 volts root mean square and leaves the recorder by way of the reference output 32.

In other words, this apparatus and method of using radar reference voltage to lock the recorder to the radar antenna reference causes the recorder to become, in fact, the radar antenna in playback. Any variations that were originally present in the radar antenna will now cause the radar recorder speed to vary accordingly. This ensures complete synchrolock between the antenna and the recorder.

I claim:

1. An apparatus for receiving, recording an playing back a radar video signal, a radar trigger signal, two radar synchrovoltages and a radar reference voltage comprising a magnetic tape recorder, means for recording the radar video and the trigger information in combined form on said tape; means for recording a pair of synchrovoltages and a radar reference voltage on separate tracks of said tape; means for playing back said video and trigger information; means for playback of said pair of synchrovoltages; and means for playing back the radar reference voltage whereby said radar reference voltage locks the playback of the recorder speed to the original antenna rotation.

* * * * *